Figure 1:
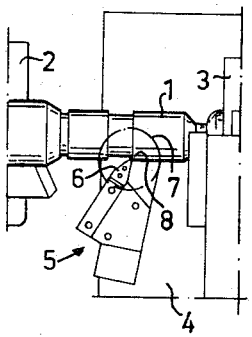

United States Patent [19]

Bergstrom et al.

[11] 3,851,551
[45] Dec. 3, 1974

[54] TOOL ASSEMBLY, PARTICULARLY FOR LATHE CHIP SEPARATING TOOLS

[76] Inventors: Peter Christoph Bergstrom, Kofallsvagen 44, S-710 40 Frovi; Dick Carl Birger Birgersson, Ringvagen 7; Jan Gustav Harald Birgersson, Ekliden 6, both of S-573 00 Tranas, all of Sweden

[22] Filed: Jan. 26, 1973

[21] Appl. No.: 327,119

[30] Foreign Application Priority Data
Feb. 9, 1972  Germany............................. 7204774
Oct. 18, 1972  Sweden............................. 13443/72

[52] U.S. Cl............................... 82/37, 29/98, 82/12
[51] Int. Cl.......................... B23b 29/00, B26d 1/00
[58] Field of Search.......... 82/36, 37, 12, 14; 29/96, 29/98

[56] References Cited
UNITED STATES PATENTS
94,930   9/1869   Wenzel.................................. 82/37
262,734  8/1882   Buckley................................. 82/37
1,666,109 4/1928  Sheberashenko....................... 29/98
1,715,844 6/1929  Kienzl.................................. 29/98
2,489,183 11/1949 Inge..................................... 82/12
2,524,401 10/1950 Schwab................................ 29/98
2,529,551 11/1950 Havsam................................ 82/36
3,128,657 4/1964  Herbert................................. 82/12
3,590,672 7/1971  Cordier................................. 82/12

FOREIGN PATENTS OR APPLICATIONS
904,081  2/1945  France................................. 29/98
137,900  1/1920  Great Britain........................ 29/98

Primary Examiner—Harrison L. Hinson
Attorney, Agent, or Firm—Young & Thompson

[57] ABSTRACT

A tool assembly, particularly for lathe chip separating tools. The assembly includes a tool holder which is capable of being rotated about an axis whose centre line passes through the tip of the tool with sharp tipped tools or through the centre of the nose radius with round nose tools.

5 Claims, 7 Drawing Figures

TOOL ASSEMBLY, PARTICULARLY FOR LATHE CHIP SEPARATING TOOLS

The present invention relates to a tool assembly, particularly for lathe chip separating tools.

When turning heavy profiled work pieces it is usual and even necessary to use different types of lathe tools and to change the position of the tool and/or the tool holder in order to realign the tool in relation to the workpiece, all depending on the position of the surface of the workpiece being machined. This complicates the work on hand and also requires a relatively large selection of different lathe tools to be held available.

The object of the present invention is to eliminate these disadvantages and to provide a tool means with which one and the same tool can be readily used for machining surfaces located at different positions on the workpiece. A further object of the invention is to provide a tool assembly for the aforementioned purpose which is of simple construction and reliable in operation.

These objects are obtained with the present invention, which is mainly characterized in that a tool holder is arranged for rotation about an axis whose centre line passes through the tip of the tool, or in the case of tools having rounded cutting noses, through the centre of the nose radius. Owing to the rotatability of the tool around the axis, it is possible to realign the tool in relation to the workpiece without interrupting the machining operation. This results in a more simplified and less time consuming machining operation than was previously the case.

In accordance with a particularly advantageous embodiment, the tool holder can be rotated by means of a swivel device, there being located between the swivel device and the tool holder a gear means. This arrangement permits changes in tool alignment to be made readily and with the desired degree of accuracy. Further, the swivel device and the tool holder may be interengaged by a rotatable intermediate element, the swivel device and the tool holder being arranged for rotation in the same direction.

With another embodiment of the invention, the tool holder may be locked in its adjusted position. Thus, a locking means may be arranged to clamp the tool holder in a direction generally parallel to the axis of rotation of the tool holder. In this connection it is suitable that the tool holder and the locking means are arranged in a common base plate and that the locking means embodies two rotatable mutually engaging elements, of which one is connected with a rotatable handle and the other is arranged to be moved axially when rotated around its axis to lock or to release the tool holder. The advantage to be gained by arranging that the tool holder can be locked in its set positon is that an interrupted machining operation, for example, can be readily resumed without it being necessary to check the alignment of the tool in relation to the workpiece. Further, with this arrangement there is less chance of the tool being moved in the tool holder as a result of the forces acting on the tool during a machining operation.

With another embodiment of the invention, the tool assembly can be provided with means for releasing the tool holder from the swivel device. When the tool assembly is provided with an intermediate element, said element may suitably comprise an axially displaceable gear wheel arranged by means of a clutch device to be moved axially to an idling position against a spring force. The advantage gained hereby is that the tool holder and swivel device can be readily adjusted to different mutual positions.

In addition, the advantage is also gained whereby the tool holder can be readily removed from its bearing means and replaced with a different tool holder of a similar or different construction. The tool setting can also be made by means of conventional indicating devices arranged externally of the machine. The above reference to a tool holder of different construction is made here with respect to a tool holder of the quick shift type, tool holders intended for working concave or convex surfaces, or tool holders of such construction that both standard type tools and special type tools can be used therein.

Figure 2:
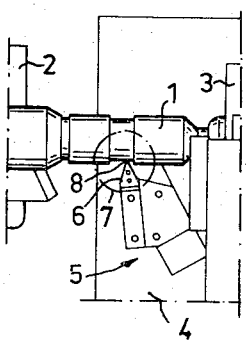
Figure 3:
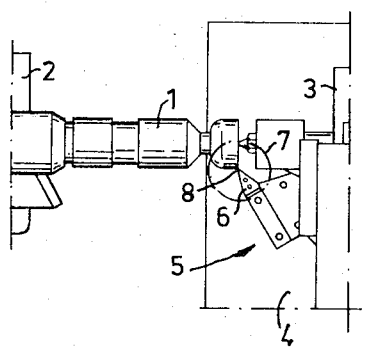
Figure 4:
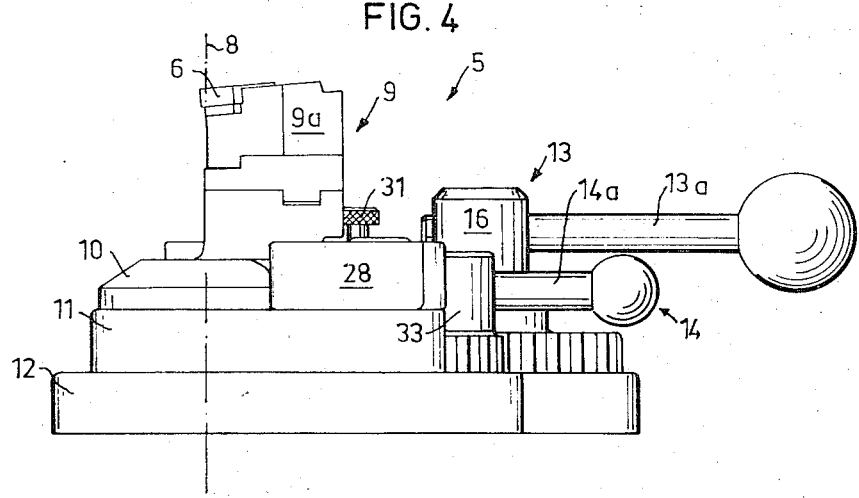
Figure 5:
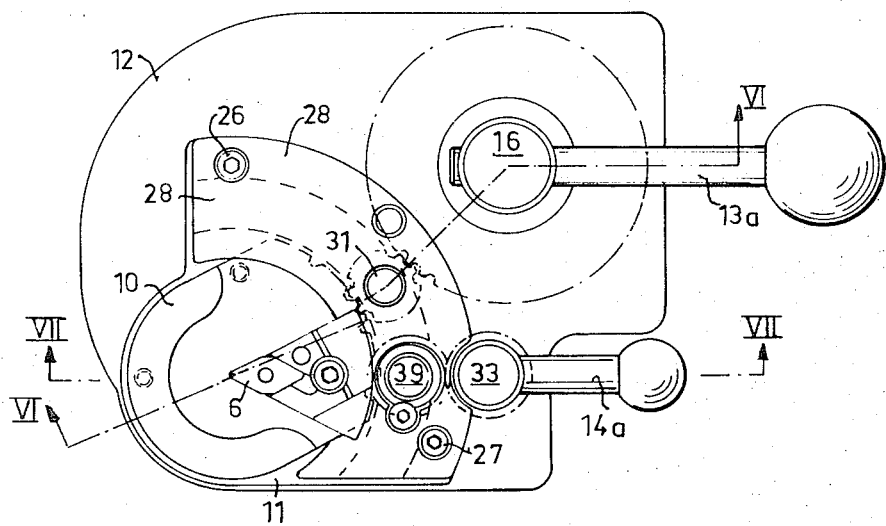
Figure 6:
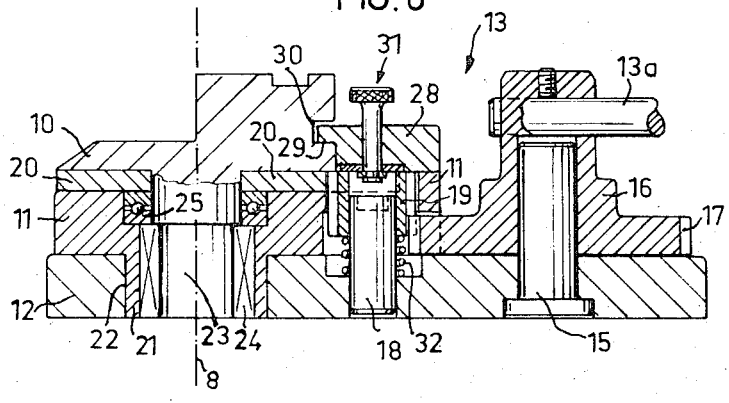
Figure 7:
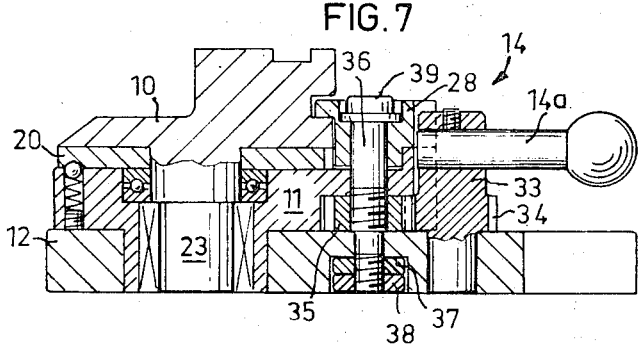

The invention will now be described in more detail with reference to an embodiment thereof illustrated in the accompanying drawings, where:

FIGS. 1–3 illustrate a tool assembly constructed in accordance with the invention in different working positions when machining a heavily profiled workpiece, FIG. 4 illustrates in side view a preferred embodiment of the tool assembly according to the invention, FIG. 5 illustrates in plan view the embodiment of FIG. 4, FIG. 6 is a sectional view taken through the line VI—VI in FIG. 5, and FIG. 7 is a sectional view taken through the line VII—VII in FIG. 5.

Referring to FIGS. 1–3, a workpiece 1 is shown clamped between a chuck 2 and a tailstock 3 on a lathe, not shown in detail. Mounted on a slide 4 capable of being moved parallel with and transversely of the longitudinal axis of the workpiece is a tool assembly 5, in which a chip separating tool 6 is capable of rotating around a portion of the periphery of a circle 7 around an axis 8 extending perpendicularly to the plane of the drawing. In the case of a sharp pointed tool, the centre line of the axis passes through the tip of the tool, or when the tool has a rounded nose said centre line passes through the centre of the nose radius. As will be seen from FIGS. 1–3, the tool can readily be set to different working angles by rotating the tool around the axis 8, thereby enabling a workpiece of complicated shape to be machined without changing the tool. In the illustrated embodiment, the tool can be rotated in either direction from a plane extending perpendicularly in relation to the longitudinal axis of the workpiece.

The tool assembly 5, however, can be constructed in a number of different ways, of which the embodiment illustrated in FIGS. 4–7 constitutes an example. In the illustrated tool assembly the tool 6 can be removably or fixedly mounted in a tool holder 9 comprising a tool attachment 9a and a rotatable frame 10, the tool attachment and the frame suitably being detachably joined to each other. The frame 10 is rotatably mounted in a base plate 12 through an intermediate portion 11, the base plate in turn being intended for attachment to the slide 4 via attachment means, not shown. The frame 10 is intended to be rotated around the axis 8 by means of a frame swiveling device 13 and is intended to be locked in any desired position relative to the base plate 12 by means of a locking device 14. A handle 13a forming part of the swiveling device 13 is mounted in a rotatable body 16 mounted for rotation around a peg 15 in the base plate 12, the body 16 being provided at the bottom thereof with a gear ring 17 (FIG. 6), the gear ring extending either completely or partially around said body 16. The gear ring 17 engages a gear 19 mounted for rotation on a stud 18 arranged in the base plate 12, the gear 19 in turn meshing with a gear segment 20 mounted to the underside of the frame 10.

As will be seen more clearly from FIG. 6, a neck portion 21 of the intermediate portion 11 extends down into a hole 22 disposed in the base plate 12. The frame 10 is extended at the bottom thereof with an abutment 23, the lower portion of which is rotatable in and guided in the intermediate portion 11 via a needle bearing 24. The gear segment 20 mounted on the underside of the frame 10 bears against the intermediate portion 11 via an axial ball bearing 25. Mounted on a portion of the intermediate member 11 extending beyond the frame 10 and the gear segment 20 by means of screws 26, 27 is a locking element 28, one edge surface of which supports against the outer portion of the intermediate member 11 and which engages a horizontal, circular arcuate groove 30 in the side of the frame 10 through a shoulder 29.

The gear wheel 19, which is housed in a recess in the intermediate member 11, is capable of being displaced downwardly on the peg 18 against the force of a coil spring 32 by means of an axially movable disengaging device 31 guided for vertical movement in the locking element 28. By pressing down the disengaging device 31, the gear wheel 19 can be moved out of engagement with the gear segment 20 so that the frame 10 can be turned to the desired angle without it being necessary to rotate the swiveling device 13 at the same time. This is an advantage when it is desired to set the tool 6 while retaining the alignment of the swiveling handle 13a unchanged. Subsequent to setting the tool to the desired position, the disengaging device 31 is released, whereupon the spring 32 returns the gear wheel 19 into engagement with the gear segment 20.

As will be seen from FIG. 7, the locking means 14 includes a handle 14a mounted in a holder 33 which is journalled for rotation in the base plate 12. The holder 33 is provided with a partially or fully circumferentially extending gear ring 34 which engages a gear wheel 35. The gear wheel 35 is screwed onto a screw 36, the lower portion of which enters the base plate 12 and is secured there by means of nuts 37, 38. The upper portion of the screw extends through the intermediate member 11 and the locking element 28 so that the head 39 of the screw bears against the locking element in a recess disposed therein via a washer or the like. By turning the handle 14a in the locking direction, the gear wheel 35 is moved upwardly on the screw 36 so that the locking element 28 and the intermediate member 11 are pressed against each other. The shoulder 29 thus locks the frame 10 and the gear segment 20 to the intermediate member 11 which is prevented, inter alia by the screw 36, from being turned around the shaft 8. When the handle 14a is turned in the opposite direction, i.e., in the released direction, the nut 35 is moved downwardly on the screw to release the locking effect.

By providing the gear ring 17 with the same radius as the gear segment 20 rotation of the handle 13a through a certain angle will cause the tool holder 9 to be rotated through an equally large angle, and the gear wheel 19 will also cause the tool 6 and the handle 13a to rotate in the same direction. The means, by which the tool holder 9 is turned, however, may be constructed differently from those illustrated and described above. For example, the swiveling handle may be placed directly on the tool holder 9, or alternatively the gear ring 17 may be permitted to activate the gear segment 20 directly, without the arrangement of an intermediate gear. A third possibility resides in the use of more than one intermediate gear wheel. In all instances, however, it is possible to select the gear ratios according to requirements so that the desired easy rotation of the tool holder can be effected.

Further, the tool holder may be rotated by motorized means, wherewith said tool holder is rotated automatically in accordance with a determined program. The tool holder may also be rotated during the actual working operation, thereby enabling the tool setting providing the largest cut with the least amount of energy consumption to be found in a particularly simple manner. By way of example, further time can be saved when turning heavy workpieces by cutting from right to left as seen in FIGS. 1-3, and by then taking a fine cut during the turning operation from left to right as seen in the figures.

Although the invention has been described with reference to a number of embodiments thereof, these embodiments are not restrictive of the basic concept of the invention. For example, the locking means and other elements forming part of the tool assembly may be constructed in a manner different from that illustrated and described.

As illustrated, the tool assembly may be manually guided, although it may also be guided by different degrees of automization by means of templates, computers and similar automatic guiding devices. Further, the tool may be arranged for movement along the axis of rotation and can also be made rotatable around more axes than the illustrated axis. Neither is the invention restricted to its use with lathes but can be applied to a number of other tools than lathe tools.

We claim:

1. A tool assembly comprising a lathe chip separating tool and a holder for the lathe tool, means mounting said holder for rotation about an axis that passes through the point of the tool or, in the case of a round-nosed tool, through the center of the nose radius, a swiveling device for rotating the holder about said axis, and gearing interposed between the swiveling device and the tool holder, said gearing including a rotatable gear disposed between and in mesh with said swiveling device and said tool holder thereby to turn said tool holder in the same direction as said swiveling device upon swiveling of said swiveling device, said tool holder and said swiveling device having gearing thereon of the same radius whereby said tool holder rotates by the same angular amount as said swiveling device.

2. A tool assembly comprising a lathe chip separating tool and a holder for the lathe tool, means mounting said holder for rotation about an axis that passes through the point of the tool or, in the case of a round-nosed tool, through the center of the nose radius, a swiveling device for rotating the holder about said axis, gearing interposed between the swiveling device and the tool holder, and means for releasably locking said tool holder in a rotated position, said locking means clamping the tool holder in a direction substantially parallel to the axis of rotation of the tool holder, said tool holder and said locking means being mounted on a common base plate, said locking means including two rotatable interengaging elements of which one is connected with a handle and the other is mounted for movement in a direction parallel to the axis of rotation of said tool holder thereby releaseably to lock the tool holder.

3. A tool assembly comprising a lathe chip separating tool and a holder for the lathe tool, means mounting said holder for rotation about an axis that passes through the point of the tool or, in the case of a round-nosed tool, through the center of the nose radius, a swiveling device for rotating the holder about said axis, gearing interposed between the swiveling device and the tool holder, means for selectively disengaging said tool holder from said swiveling device, said selective disengaging means comprising a gear disposed between and in mesh with said tool holder and swiveling device, and means for axially sliding said gear out of engagement with one of said tool holder and swiveling device.

4. A tool assembly as claimed in claim 2, said other interengaging element being screw threadedly carried by a fixed screw parallel to said axis of rotation thereby to move parallel to said axis upon rotation of said other interengaging element.

5. A tool assembly as claimed in claim 3, and spring means urging said gear into engagement with both of said tool holder and swiveling device.

* * * * *